(12) United States Patent
Chi et al.

(10) Patent No.: US 6,588,415 B1
(45) Date of Patent: Jul. 8, 2003

(54) ONE-PIECE HOOD FOR AN OUTDOOR GRILL

(75) Inventors: Lin Fong Chi, Taipei (TW); Bill G. Neal, Chuckey, TN (US)

(73) Assignee: Meco Corporation, Greenville, TN (US)

( * ) Notice: Subject to any disclaimer, the term of this patent is extended or adjusted under 35 U.S.C. 154(b) by 0 days.

(21) Appl. No.: 09/696,811

(22) Filed: Oct. 26, 2000

(51) Int. Cl.[7] ................................................ A47J 37/07
(52) U.S. Cl. .................... 126/25 R; 126/41 R; 126/190
(58) Field of Search ............................. 126/41 R, 25 R, 126/190, 273 R; 220/669, 674, 573.1, 912; D7/332, 334, 337

(56) References Cited

U.S. PATENT DOCUMENTS

| | | | | |
|---|---|---|---|---|
| 383,830 A | * | 5/1888 | Shumay ................... 126/273 R |
| 2,483,269 A | * | 9/1949 | Fender ........................ 220/669 |
| 3,559,633 A | * | 2/1971 | Born et al. .................... 126/38 |
| 3,623,651 A | * | 11/1971 | Marcan ....................... 206/509 |
| 3,938,494 A | * | 2/1976 | Clark ........................ 126/41 R |
| 4,113,095 A | * | 9/1978 | Dietz et al. .................. 220/669 |

* cited by examiner

*Primary Examiner*—Henry Bennett
*Assistant Examiner*—James G. Barrow
(74) *Attorney, Agent, or Firm*—McGuireWoods LLP

(57) ABSTRACT

A one-piece hood for a gas grill is formed from a single sheet of steel and comprises at least a front wall, a back wall, opposing side walls, and a top wall. Each of the opposing side walls further includes an indented central portion that has a substantially uniform depth and a perimeter internally adjacent to the side wall perimeter. The indented central portions increase the structural strength of the hood so as to better resist warping due to heating. A sloped wall can be formed between the top wall and the front wall.

5 Claims, 5 Drawing Sheets

ONE-PIECE HOOD FOR AN OUTDOOR GRILL

FIELD OF THE INVENTION

The present invention is drawn to a one-piece hood for an outdoor grill. More particularly, the invention is to a gas grill that includes a one piece hood formed with side recesses. Additionally, the disclosed grill includes a contoured control panel and side tables that can be teardrop shaped.

BACKGROUND INFORMATION

Prior art gas grills suffer from various deficiencies. Hoods on gas grills must usually be cast in a relatively costly manner in order to have sufficient strength to prevent warping due to heat. U.S. Pat. No. 4,989,579 to Murphy et al., U.S. Pat. No. D415,388 to Wagner et al., and U.S. Pat No. D420,244 to Pai disclose the use of conventional stepped and angled ridges that are often incorporated into cast aluminum hoods in order to taper the hood for both material savings and better heat circulation (see column 3, line 66 to column 4, line 26 of Murphy et al.). FIG. 1 of U.S. Pat. No. 5,163,358 to Hanagan et al. discloses a similar ridge element depending vertically from the top wall and slanting to the front wall. These ridges inherently stiffen the walls against bending, but none of this art suggest the desirability of stiffening along the entire perimeter of a side wall.

U.S. Pat. Nos. D237,856 to Madson et al. and U.S. Pat. No. D229,660 to Gammon disclose hoods with semicircular side walls that are indented, but only adjacent to the curved upper portions of the walls. The "indentation" continues to the bottom edge to be coextensive with the bottom of the side wall perimeter and therefore not "adjacent" to the perimeter along that portion. Additionally, Madson et al. does not have an indentation of a substantially uniform depth and Gammon does not disclose a hood formed in one piece. As design patents, neither Madson et al. nor Gammon suggests any reasons or advantages of this design, beyond ornamentation.

BRIEF SUMMARY OF THE INVENTION

It is an object of the invention to provide an outdoor grill that includes a one-piece hood formed with side recesses that provide strength to resist warping under heating conditions.

It is another object of the invention to provide a grill hood that is both durable and attractive, yet inexpensive to produce.

DETAILED DESCRIPTION OF THE INVENTION

Figure 1:
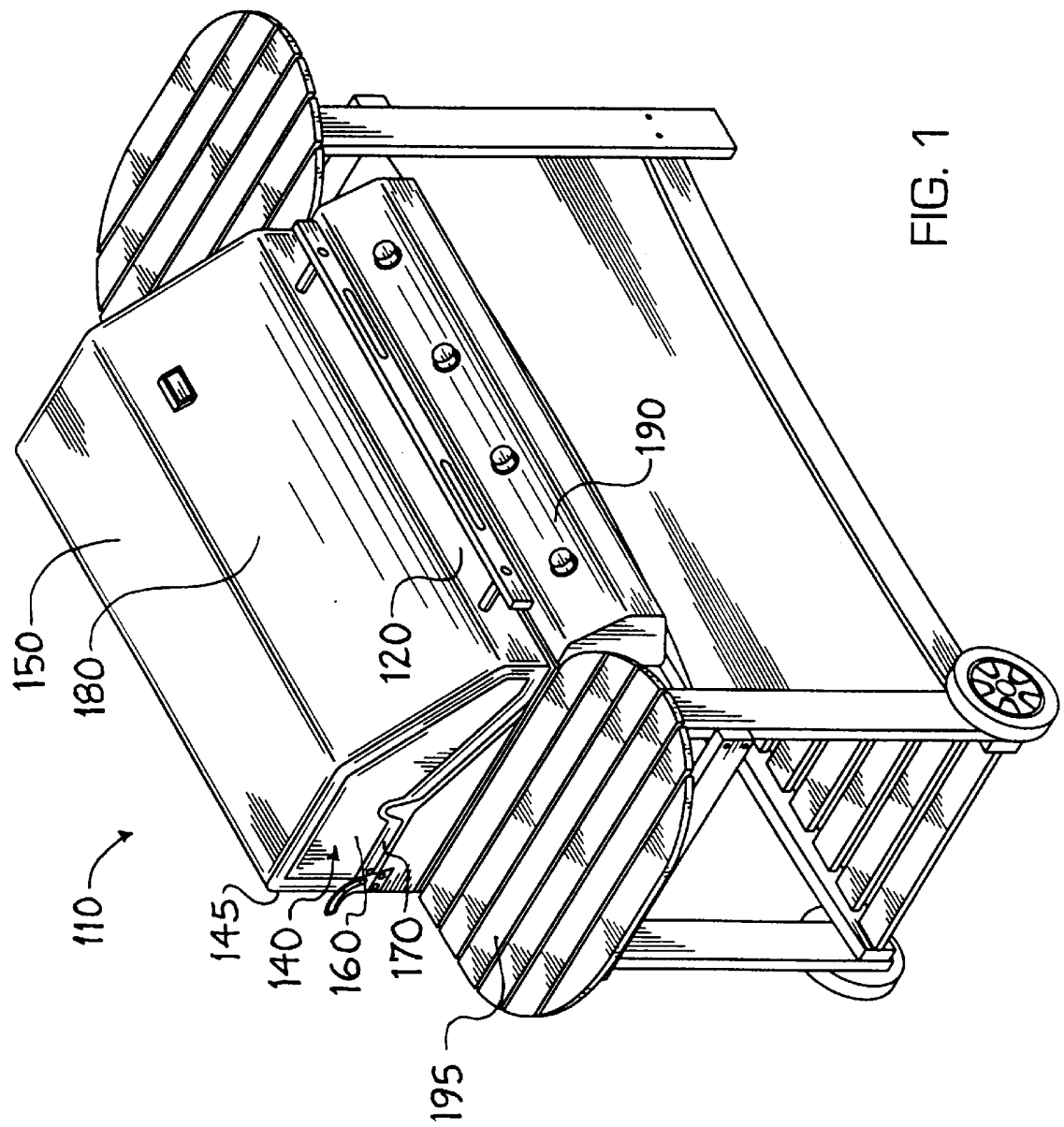
FIG. 1 illustrates a perspective view of the one-piece hood of the present invention in combination with a grill.

The present invention is a one-piece hood for gas grills that incorporates recesses or indentations in the side walls, as shown in FIGS. 1 through 5. It includes a one-piece hood for gas grills and a method of forming the hood from stamped steel. As shown in the attached figures, especially FIGS. 1 and 5, the hood is formed with recesses in the sides. The recesses add a great deal of strength to prevent twisting and flex under heated conditions. The one-piece gas hood apparatus invention is considered, at a minimum, to include:

A one-piece hood 110 for a gas grill comprising:
   a front wall 120;
   a back wall 130;
   opposing side walls 140; and
   a top wall 150, wherein each of said opposing side walls 140 further comprises an indented central portion 160 having a substantially uniform depth and a perimeter 170 internally adjacent to the side wall 140 perimeter 145.

The one-piece gas hood method invention is considered, at a minimum, to include:

A method for forming a one-piece hood 110 for a gas grill comprising:
   forming a front wall 120, a back wall 130, opposing side walls 140, and a top wall 150 as a single piece; and
   forming an indented central portion 160 in each side wall, said indented central portion having a substantially uniform depth and a perimeter 170 internally adjacent to the side wall 140 perimeter 145.

The one-piece hood 110 can also include a slope-front wall 180 and is preferably formed from a single piece of steel.

Figure 2:
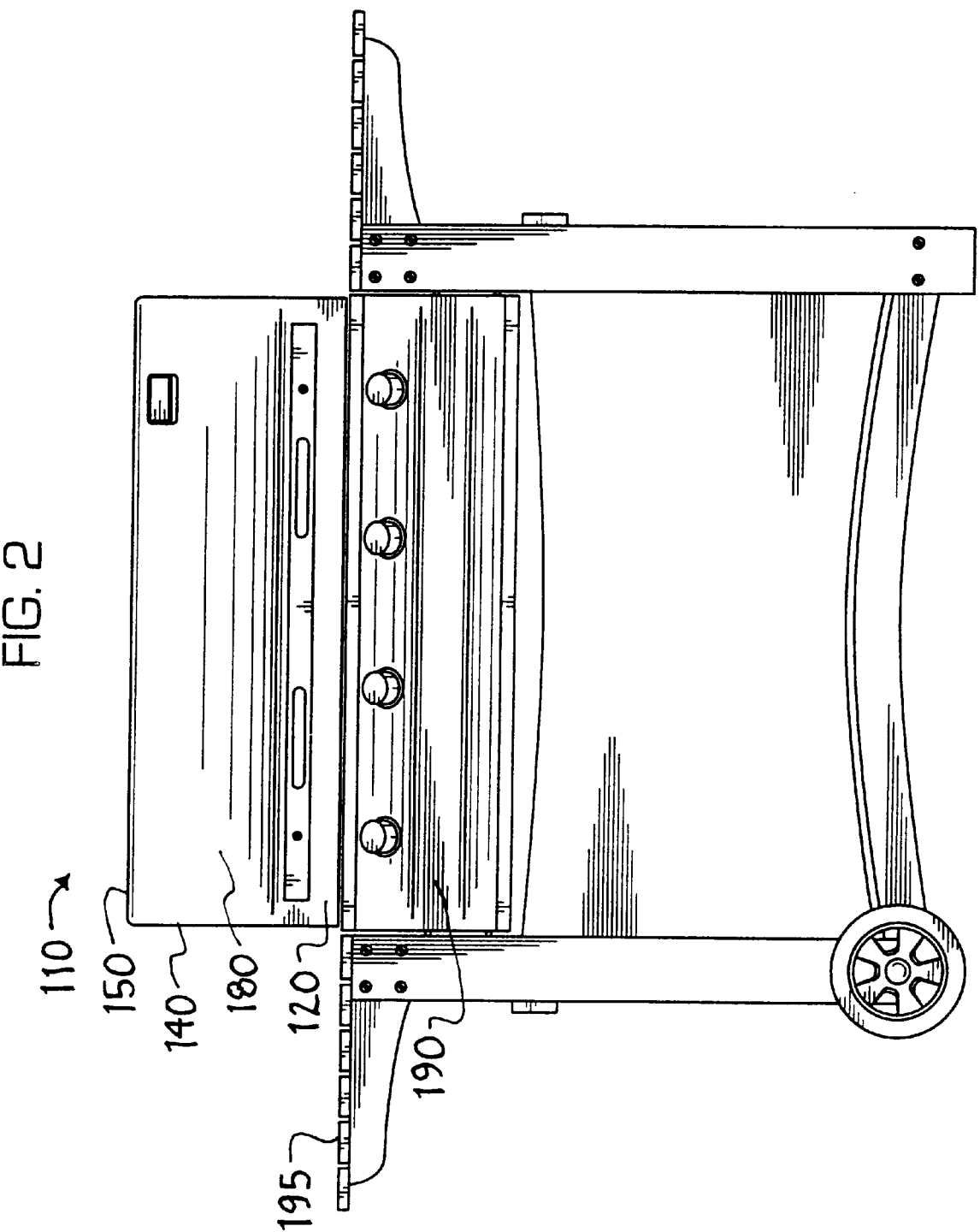
FIG. 2 illustrates a front view of the one-piece hood of the present invention in combination with a grill.
Figure 3:
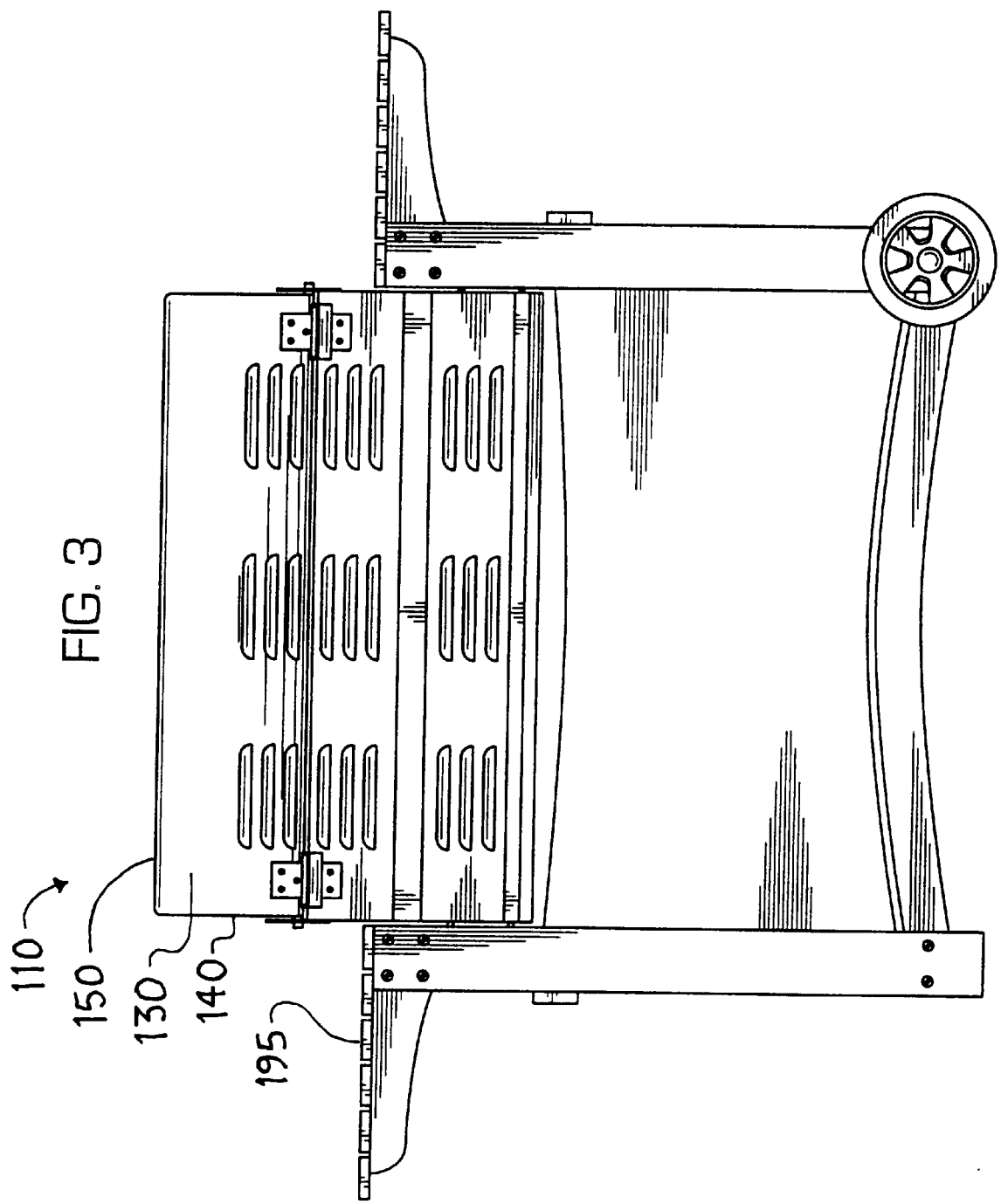
FIG. 3 illustrates a back view of the one-piece hood of the present invention in combination with a grill.
Figure 4:
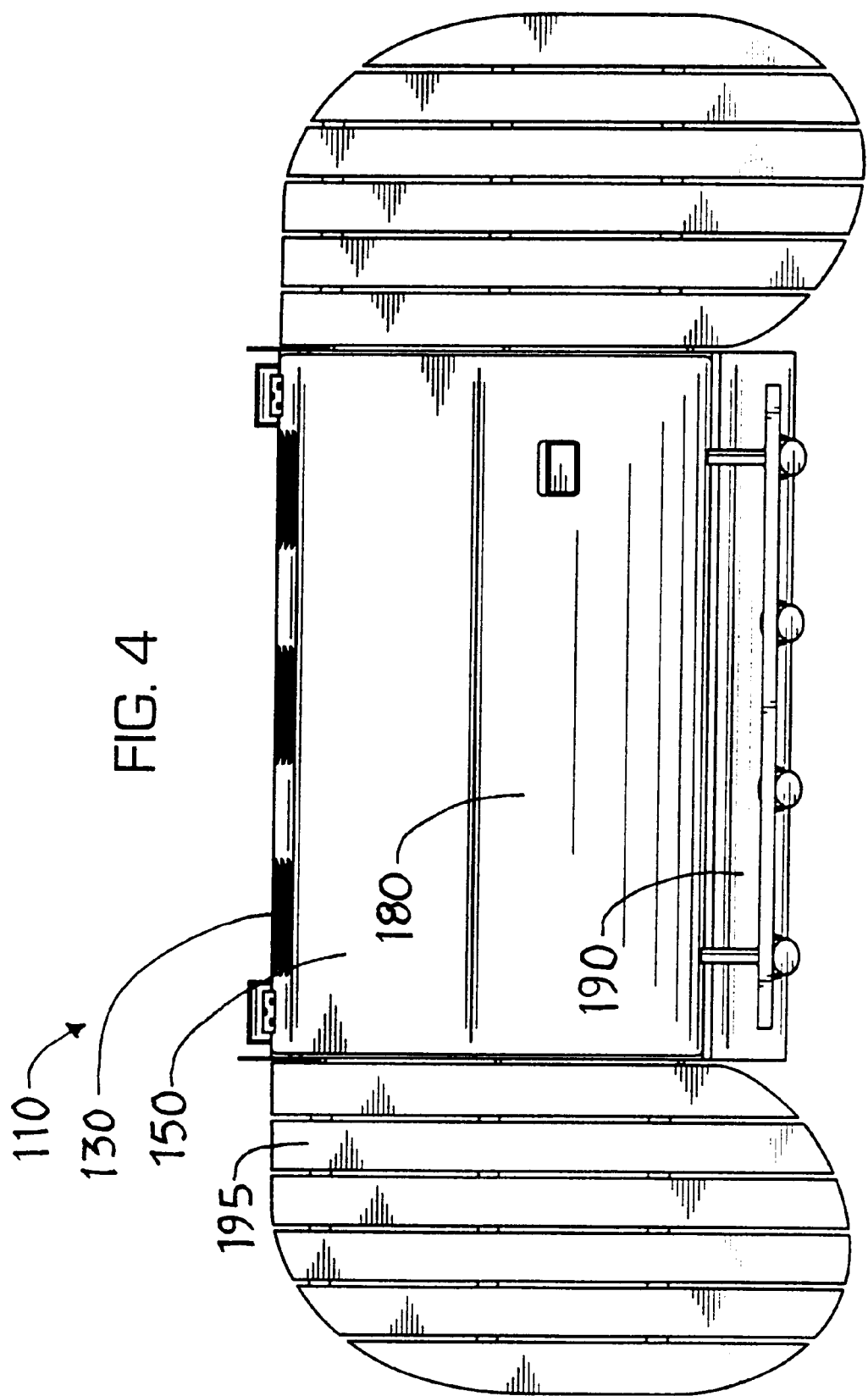
FIG. 4 illustrates a top view of the one-piece hood of the present invention in combination with a grill.
Figure 5:
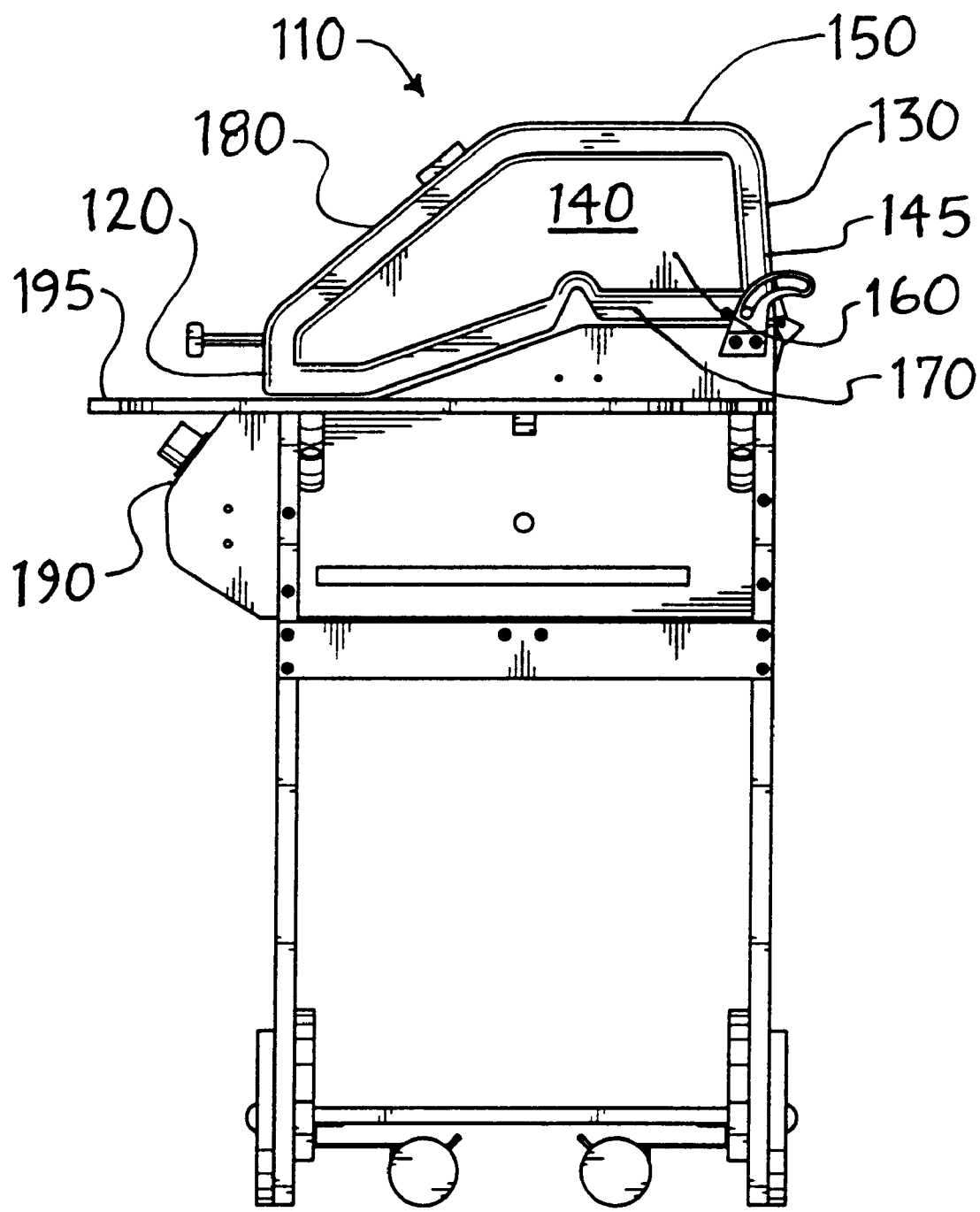
FIG. 5 illustrates a side view of the one-piece hood of the present invention in combination with a grill.

As shown most clearly in FIGS. 1, 2, and 5, the front control panel 190 of the grill can incorporate a contoured design. Additionally, as shown in FIGS. 1 and 4, the grill can also incorporate side tables 195 that have a "tear drop" shape.

In a preferred embodiment, the hood is painted or porcelain-coated and formed from approximately 0.05" thick steel sheet by a deep draw forming process to provide recesses of a substantially uniform depth of about 0.04".

Although exemplary embodiments have been disclosed herein, many other configurations within the scope of the present invention are possible, with the present invention being limited only by the appended claims.

We claim:

1. A method for forming a one-piece hood for a gas grill comprising:

forming a front wall, a back wall, opposing side walls, and a top wall as a single piece; and forming an indented central portion in each side wall, said indented central portion having a substantially uniform depth and a perimeter internally adjacent to the side wall perimeter.

2. The method for forming a one-piece hood of claim 1, wherein a sloped-front wall is formed between said top wall and said front wall.

3. The method for forming a one-piece hood of claim 1, wherein said one-piece hood is at formed from a single piece of steel.

4. The method for forming a one-piece hood of claim 3, wherein said steel is approximately 0.05" thick and said substantially uniform depth is about 0.04".

5. The method for forming a one-piece hood of claim 1, wherein said one-piece hood is formed by a deep draw forming process.

* * * * *

UNITED STATES PATENT AND TRADEMARK OFFICE
CERTIFICATE OF CORRECTION

PATENT NO.   : 6,588,415 B1
DATED        : July 8, 2003
INVENTOR(S)  : Bill G. Neal It is certified that error appears in the above-identified patent and that said Letters Patent is hereby corrected as shown below:

<u>Title page,</u>
Item [75], Inventor, delete "Lin Fong Chi, Taipei (TW);"

Signed and Sealed this

Twenty-seventh Day of April, 2004

JON W. DUDAS
*Acting Director of the United States Patent and Trademark Office*